United States Patent
Sun et al.

(10) Patent No.: US 12,483,341 B2
(45) Date of Patent: Nov. 25, 2025

(54) SIGNAL TRANSMISSION METHOD, APPARATUS, ELECTRONIC DEVICE AND COMPUTER READABLE STORAGE MEDIUM

(71) Applicant: Samsung Electronics Co., Ltd., Suwon-si (KR)

(72) Inventors: Feifei Sun, Beijing (CN); Jingxing Fu, Beijing (CN); Qi Xiong, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 17/309,120

(22) PCT Filed: Nov. 1, 2019

(86) PCT No.: PCT/KR2019/014752
§ 371 (c)(1),
(2) Date: Apr. 27, 2021

(87) PCT Pub. No.: WO2020/091527
PCT Pub. Date: May 7, 2020

(65) Prior Publication Data
US 2022/0006539 A1 Jan. 6, 2022

(30) Foreign Application Priority Data
Nov. 1, 2018 (CN) .......................... 201811296776.7

(51) Int. Cl.
*H04L 1/00* (2006.01)
*H04B 7/04* (2017.01)
(Continued)

(52) U.S. Cl.
CPC ........... *H04B 17/24* (2015.01); *H04B 7/0691* (2013.01); *H04B 7/0874* (2013.01); *H04L 5/0048* (2013.01); *H04W 8/24* (2013.01)

(58) Field of Classification Search
CPC .... H04B 7/0639; H04B 7/024; H04B 7/0691; H04B 7/0802; H04B 7/06956;
(Continued)

(56) References Cited

U.S. PATENT DOCUMENTS 9,374,144 B2 6/2016 Kang et al.
9,503,231 B2 11/2016 Gaal et al.
(Continued)

FOREIGN PATENT DOCUMENTS

JP 2015164342 A 9/2015
JP 2017098992 A 6/2017
(Continued)

OTHER PUBLICATIONS

Supplementary European Search Report dated Jul. 9, 2021 in connection with European Application No. 19878705.3, 9 pages.
(Continued)

*Primary Examiner* — Marcus Smith
*Assistant Examiner* — Jason A Harley

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The present disclosure provides a signal transmission method, apparatus, electronic device and computer readable storage medium.

12 Claims, 8 Drawing Sheets

(51) Int. Cl.
| | |
|---|---|
| *H04B 7/06* | (2006.01) |
| *H04B 7/08* | (2006.01) |
| *H04B 17/24* | (2015.01) |
| *H04L 5/00* | (2006.01) |
| *H04W 4/029* | (2018.01) |
| *H04W 8/24* | (2009.01) |
| *H04W 24/10* | (2009.01) |
| *H04W 72/04* | (2023.01) |

(58) Field of Classification Search
CPC .... H04B 7/0874; H04B 7/155; H04B 7/0617; H04B 7/08; H04B 7/0473; H04W 72/23; H04W 72/04; H04W 72/02; H04W 24/10; H04L 5/006
USPC .................................................. 370/252, 278
See application file for complete search history.

(56) References Cited

U.S. PATENT DOCUMENTS

| | | | |
|---|---|---|---|
| 9,843,938 B2 | 12/2017 | Kang et al. | |
| 10,306,501 B2 | 5/2019 | Lee et al. | |
| 2005/0197080 A1 | 9/2005 | Ulupinar et al. | |
| 2006/0270343 A1 | 11/2006 | Cha et al. | |
| 2008/0220819 A1 | 9/2008 | Ben-Eli | |
| 2010/0167672 A1* | 7/2010 | Ahn | H04B 17/23 455/132 |
| 2011/0194551 A1* | 8/2011 | Lee | H04L 5/0048 375/267 |
| 2014/0241446 A1* | 8/2014 | Zhang | H04B 7/0413 375/260 |
| 2015/0017940 A1 | 1/2015 | Soriaga et al. | |
| 2015/0195024 A1* | 7/2015 | Kim | H04B 7/0639 375/295 |
| 2015/0230102 A1 | 8/2015 | Kang et al. | |
| 2017/0202014 A1 | 7/2017 | Moon et al. | |
| 2018/0287680 A1 | 10/2018 | Xu et al. | |
| 2019/0096520 A1* | 3/2019 | Strobel | G06T 7/149 |
| 2019/0098520 A1* | 3/2019 | Kim | H04W 76/27 |
| 2019/0384058 A1* | 12/2019 | Gullicksen | G01R 33/02 |
| 2020/0119788 A1* | 4/2020 | Huang | H04B 7/0486 |
| 2020/0120604 A1* | 4/2020 | Nam | H04W 76/28 |
| 2021/0050895 A1* | 2/2021 | Kang | H04B 7/0639 |
| 2021/0120604 A1* | 4/2021 | Jones | H04W 4/80 |
| 2021/0282143 A1* | 9/2021 | Lee | H04W 52/343 |

FOREIGN PATENT DOCUMENTS

| | | |
|---|---|---|
| KR | 10-2013-0133706 A | 12/2013 |
| KR | 20150066525 A | 6/2015 |
| KR | 20150067155 A | 6/2015 |
| KR | 10-2016-0094321 A | 8/2016 |
| KR | 20170097702 A | 8/2017 |
| WO | 2013130889 A2 | 9/2013 |
| WO | 2017196249 A1 | 11/2017 |
| WO | 2019233208 A1 | 12/2019 |

OTHER PUBLICATIONS

International Search Report and Written Opinion of the International Searching Authority in connection with International Application No. PCT/KR2019/014752 issued Feb. 13, 2020, 9 pages.
Sony, "Beam failure detection and maintenance", R2-1810119 (resubmission of R2-1807787), 3GPP TSG RAN WG2 AH-1807 Meeting, Montreal, Canada, Jul. 2-6, 2018, 6 pages.
Hearing Notice dated Jan. 3, 2024 in connection with Indian Patent Application No. 202137005809, 3 pages.
Office Action issued Sep. 10, 2024, in connection with Korean Patent Application No. 10-2021-7007629, 13 pages.
Communication pursuant to Article 94(3) EPC dated Feb. 14, 2025, in connection with European Patent Application No. 19878705.3, 7 pages.
Decision of Patent dated May 15, 2025, in connection with Korean Application No. 10-2021-7007629, 5 pages.

* cited by examiner

SIGNAL TRANSMISSION METHOD, APPARATUS, ELECTRONIC DEVICE AND COMPUTER READABLE STORAGE MEDIUM

CROSS-REFERENCE TO RELATED APPLICATIONS

This application is a 371 National Stage of International Application No. PCT/KR2019/014752, filed Nov. 1, 2019, which claims priority to Chinese Patent Application No. 201811296776.7, filed Nov. 1, 2018, the disclosures of which are herein incorporated by reference in their entirety.

BACKGROUND

1. Field

The present application relates to the field of wireless communication technologies, and in particular, to a signal transmission method, apparatus, electronic device, and computer readable storage medium.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In continuous development of the field of wireless communication technologies, 5G NR (New Radio Access) technology becomes more and more important, which is an important foundation for next-generation cellular mobile technology and can achieve ultra-low delay and high reliability.

SUMMARY

In the NR, a user equipment (UE) needs to support 4 receiving antennas. Compared with the commonly used UE standard equipped with 2 antennas currently, the UE using of 4 antennas brings a large gain in spatial multiplexing, which may significantly increase the capacity and downlink rate. It is conceivable that a UE in future may be configured with 8, 12 or even more antennas.

However, in some cases, the UE does not need to use all of receiving antennas. For example, some services only need 2 antennas. All antennas of NR-enabled UEs in the prior art are always turned on, which may cause waste of power consumption of UEs.

In order to overcome the above technical problems or at least partially solve the above technical problems, the following technical solutions are proposed:

In a first aspect, the present application provides a signal transmission method, the method including:
determining a manner of adjusting receiving and/or transmitting antenna(s) by a user equipment (UE); adjusting the current receiving and/or transmitting antenna(s) according to the determined manner of adjusting receiving and/or transmitting antenna(s), and performing reception of downlink signal and/or transmission of uplink signal by using the adjusted receiving and/or transmitting antenna(s), by the UE.

In a second aspect, the present application provides a signal transmission apparatus, the apparatus including: a determining module, configured to determine a manner of adjusting receiving and/or transmitting antenna(s); an adjusting and transmitting module, configured to adjust the current receiving and/or transmitting antenna(s) according to the determined manner of adjusting receiving and/or transmitting antenna(s), and perform reception of downlink signal and/or transmission of uplink signal by using the adjusted receiving and/or transmitting antenna(s).

In a third aspect, the present application provides an electronic device, the electronic device including: a processor and a memory, wherein the memory stores at least one instruction, at least one program, a code set or an instruction set, the at least one instruction, the at least one program, the code set or the instruction set being loaded and executed by the processor to implement the signal transmission method according to the first aspect of the present application.

In a fourth aspect, the present application provides a computer readable storage medium for storing computer instructions, programs, code sets, or sets of instructions that, when executed on a computer, enabling the computer to execute to implement the signal transmission method according to the first aspect of the present application.

The beneficial effects brought by the technical solutions provided by the present application are: the signal transmission method, apparatus, electronic device and computer readable storage medium provided by the present application, determine a manner of adjusting receiving and/or transmitting antenna(s); adjust the current receiving and/or transmitting antenna(s) according to the determined manner of adjusting receiving and/or transmitting antenna(s), and perform reception of downlink signal and/or transmission of uplink signal by using the adjusted receiving and/or transmitting antenna(s), which may adjust receiving and/or transmitting antennas(s) in real time according to actual situations, and perform reception and transmission of signal by using the adjusted antenna(s), thereby achieving the purpose of reducing unnecessary power consumption of UE and improving signal transmission efficiency.

BRIEF DESCRIPTION OF THE DRAWINGS

In order to more clearly illustrate the technical solutions in the embodiments of the present application, the drawings used in the description of the embodiments of the present application will be briefly described below.

DETAILED DESCRIPTION

Figure 1:
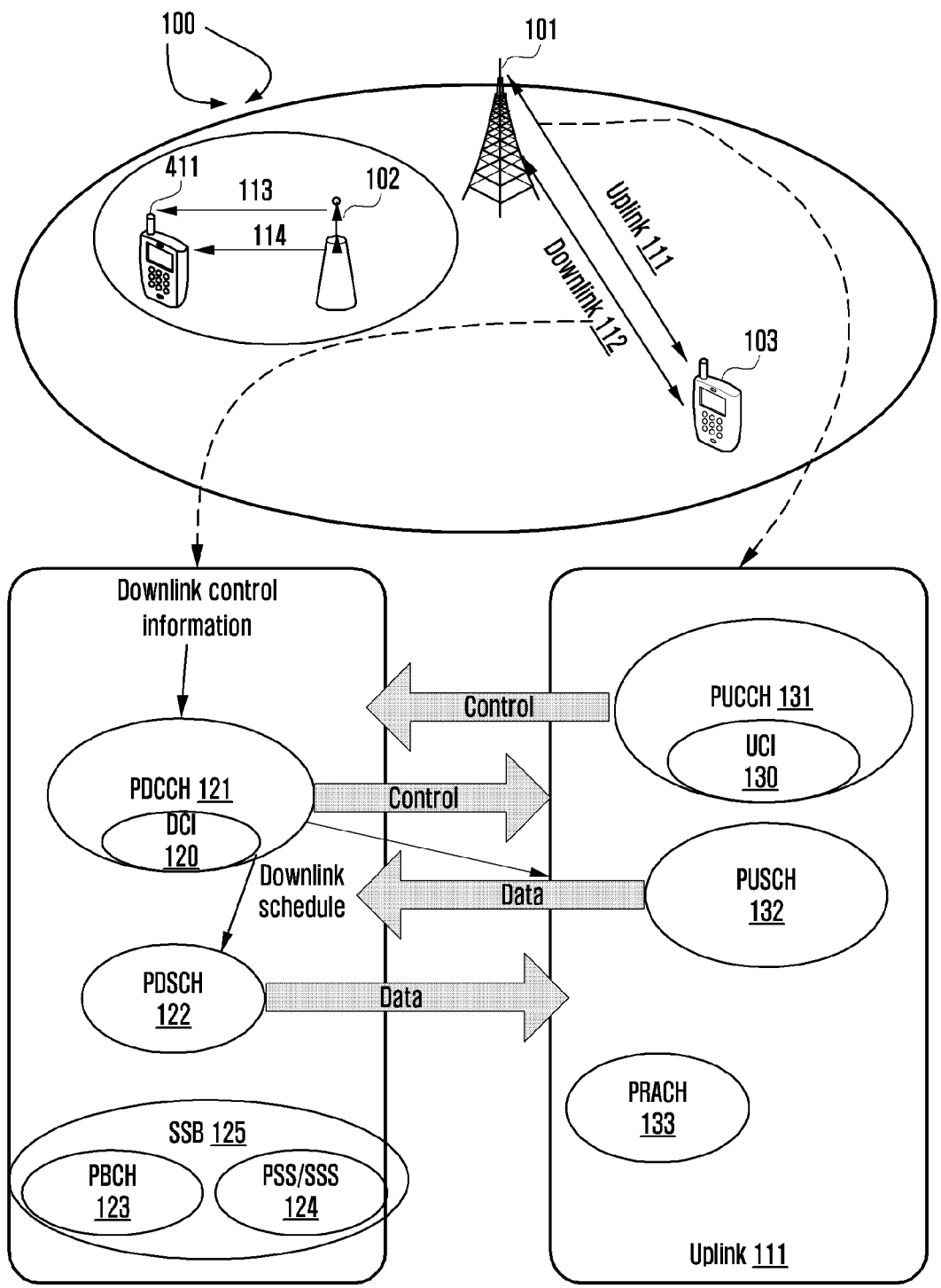
FIG. 1 is a schematic diagram of a wireless communication system provided by an embodiment of the present application.

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/including" used in this specification of the present application specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the objects, technical solutions and advantages of the present application more clear, the embodiments of the present application will be further described in detail below with reference to the accompanying drawings.

FIG. 1 shows an example of a wireless communication system 100 in accordance with an embodiment of the present application, wherein the wireless communication system 100 includes one or more fixed infrastructure units that form a network distributed over a geographic area. The infrastructure units may include an access point (AP), an access terminal (AT), a base station (BS), a NodeB, an evolved NodeB (eNB) and a next generation base stations (gNB) or other terms used in the art.

As shown in FIG. 1, the infrastructure units 101 and 102 provide services for a plurality of mobile stations (MSs) or UEs or terminal devices or the users 103 and 104 in a service area that is within a cell or cell sector range. In some systems, one or more BSs are communicatively coupled to a controller forming an access network, which the controller is communicatively coupled to one or more core networks. This example is not limited to any particular wireless communication system.

In time domain and/or frequency domain, the infrastructure units 101 and 102 respectively transmit the downlink (DL) communication signals 112 and 113 to the MSs or UEs 103 and 104. The MSs or UEs 103 and 104 communicate with the infrastructure units 101 and 102 via uplink (UL) communication signals 111 and 114, respectively.

In one embodiment, the mobile communication system 100 is an orthogonal frequency division multiplexing (OFDM)/orthogonal frequency division multiple access (OFDMA) system including a plurality of base stations and a plurality of UEs. The plurality of base stations include a base station 101 and a base station 102, and the plurality of UEs include a UE 103 and a UE 104. The base station 101 communicates with the UE 103 via the UL communication signal 111 and the DL communication signal 112.

When the base station has a downlink packet to be sent to the UE, each UE obtains a downlink allocation (resource), for example, a set of radio resources in a physical downlink shared channel (PDSCH). When the UE needs to send a packet to the base station in the uplink, the UE obtains authorization from the base station, where the authorization allocates a physical uplink shared channel (PUSCH) including a sets of uplink radio resources. The UE acquires downlink or uplink scheduling information from a physical downlink control channel (PDCCH) specialized for itself.

The downlink or uplink scheduling information and other control information carried by the PDCCH are referred to as downlink control information (DCI).

FIG. 1 also shows different physical channels illustrated by the downlink 112 and uplink 111. The downlink 112 includes a PDCCH 121, a PDSCH 122, a physical broadcast channel (PBCH) 123, and a primary synchronization signal (PSS)/secondary synchronization signal (SSS) 124. Wherein, in the 5G NR, the PSS, SSS, and PBCH together constitute one SSB (SS/PBCH block) 125. The PDCCH 121 transmits the DCI 120 to the UE, that is, the DCI 120 is carried by the PDCCH 121. The PDSCH 122 transmits downlink data information to the UE. The PBCH carries a master information block (MIB) for UE early discovery and cell-wide coverage. The uplink 111 includes a physical uplink control channel (PUCCH) 131 carrying uplink control information (UCI) 130, a PUSCH 132 carrying uplink data information, and a physical random access channel (PRACH) 133 carrying the random access information.

In one embodiment, the wireless communication network 100 use an OFDMA or multi-carrier architecture, including adaptive modulation and coding (AMC) on the downlink and a next-generation single-carrier FDMA architecture or multi-carrier OFDMA architecture for UL transmission. FDMA-based single-carrier architecture includes Interleaved FDMA (IFDMA), Localized FDMA (LFDMA), DFT-spread OFDM (DFT-SOFDM) of IFDMA or LFDMA. In addition, various enhanced non-orthogonal multiple access (NOMA) architectures of the OFDMA system are also included.

An OFDMA system serves a remote unit by allocating downlink or uplink radio resources that typically contain a set of subcarriers on one or more OFDM symbols. Exemplary OFDMA protocols include the developed LTE and 5G NRs in the 3GPP UMTS standard, as well as a series of standards, such as the IEEE 802.16 in the IEEE standards. The architecture may also include the use of transmission technologies such as multi-carrier CDMA (MC-CDMA), multi-carrier direct sequence CDMA (MC-DS-CDMA), orthogonal frequency and code division multiplexing (OFCDM). Alternatively, simpler time and/or frequency division multiplexing/multiple access technologies, or a combination of these different technologies, may be used. In an alternative implementation, the communication system may use other cellular communication system protocols including, but not limited to, time division multiple access (TDMA) or direct sequence code division multiple access (CDMA).

In the wireless communication system, in order to obtain channel state information better that enables the base station to select a more suitable code modulation mode and to select a better beamforming in a multiple-input multiple-output (MIMO) system, the UE needs to feedback the channel state information to the base station.

In addition, beamforming technology may concentrate energy to the receiver direction, thereby improving the received signal-to-noise ratio and improving reception performance. In NR, beam management is a very important technology, including the establishment of initial beam, beam adjustment, beam recover, etc. The beam adjustment includes beam adjustment on the downlink transmitting end, beam adjustment on the downlink receiving end, beam adjustment on the uplink and the like.

The inventors of the present application have found that in NR, the UE needs to support 4 receiving antennas. However, in some cases, turning on all receiving antennas does not always increase user's throughput or data rate, or the user's rate or throughput requirements may be satisfied without turning on all receiving antennas. For example, when the target user rate is low, the data size is small, or when the channel state is good, it is not necessary to turn on all the receiving antennas to satisfy the block error rate performance and the like. Meanwhile, the power consumption of the UE may be reduced by turning off the receiving antenna. For example, 4 receiving antennas may be reduced to 2 receiving antennas or 1 receiving antenna. On the contrary, when the channel state deteriorates or the required data rate or traffic becomes large, if the UE does not turn on all receiving antennas, then more receiving antennas need to be turned on to satisfy the above requirements.

The inventors of the present application have also found that changes in receiving antennas (including turning on or off part of antennas) cause changes in a receiving beam, and further beam management and channel information reporting are required.

The technical solutions of the present application and how the UE triggers and configures the change of the transmitting and receiving antenna(s) by using the technical solutions of the present application, and how the UE performs channel state information reporting in order to trigger and configure the change of the transmitting and receiving antenna(s), are detailed described in the specific embodiments below.

Figure 2:
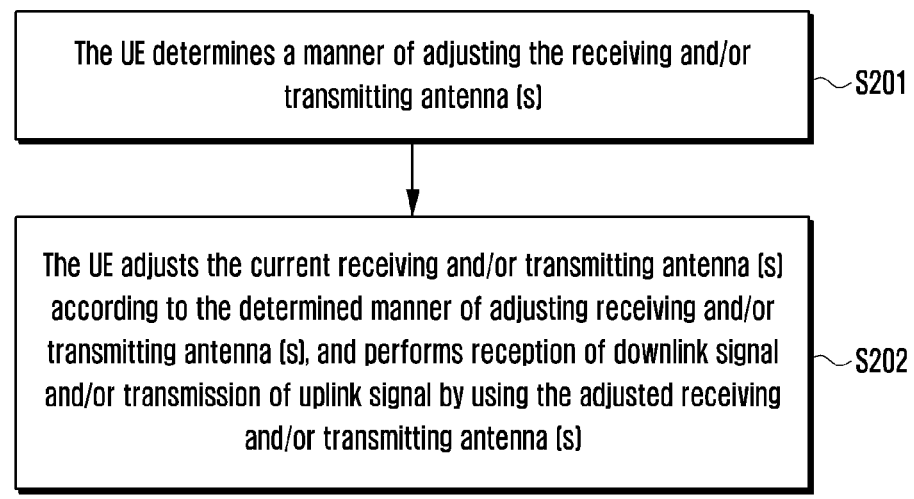
FIG. 2 is a first schematic flowchart of a signal transmission method provided by an embodiment of the present application.

The embodiment of the present application provides a signal transmission method, as shown in FIG. 2, the method including:

Step S201: the user equipment UE determines a manner of adjusting the receiving and/or transmitting antenna(s);

Step S202: the UE adjusts the current receiving and/or transmitting antenna(s) according to the determined manner of adjusting receiving and/or transmitting antenna(s), and performs reception of downlink signal and/or transmission of uplink signal by using the adjusted receiving and/or transmitting antenna(s).

Wherein, the manner of adjusting the receiving and/or transmitting antenna(s) includes at least one of the following:

increasing the number of the current receiving/transmitting antennas;

reducing the number of the current receiving/transmitting antennas;

adjusting all of the current receiving and/or transmitting antenna(s) to a first particular antenna;

adjusting part of the current receiving and/or transmitting antenna(s) to a second particular antenna.

For example, the UE may turn off 2 receiving antennas from the current 4 receiving antennas, thereby reducing power consumption, or turn on the other 2 receiving antennas from the current 2 receiving antennas to 4 receiving antennas, thereby increasing reception performance. Alternatively, when a particular antenna may have the best transmission efficiency or the channel state is not much different than that when more antennas are used, for example, {antenna 1, antenna 2} may achieve the approximate transmission efficiency or the approximate channel state of the current four receiving antennas, the antennas may be adjusted, by turning off {antenna 3, antenna 4} from the current 4 receiving antennas, to be {antenna 1, antenna 2}, thereby reducing power consumption; or, when better transmission efficiency or better channel state may be achieved by using particular receiving antennas, the current antennas may be adjusted to be the particular receiving antennas, for example, the current {antenna 3, antenna 4} may be directly adjusted to particular antennas {antenna 1, antenna 2} to improve transmission efficiency, alternatively, the current {antenna 1, antenna 3, antenna 4} may be partially adjusted to {antenna 2, antenna 3, antenna 4} to improve transmission efficiency. In practical applications, the first particular antenna and the second particular antenna may be identical or different.

In the embodiment of the present application, step S201 may be specifically implemented in the following manner:
   the UE performs channel state measurement on one or more sets of reference signals, and determines the manner of adjusting the receiving and/or transmitting antenna(s) according to the measurement result(s); and/or
   the UE determines the manner of adjusting the receiving and/or transmitting antenna(s) according to service requirement required for signal transmission.

In the embodiment of the present application, for determining the manner of adjusting the receiving and/or transmitting antenna(s) according to the measurement result(s), the reference signal for channel state measurement by the UE includes a channel state information-reference signal (CSI-RS) and/or SSB. The UE may also measure other downlink channels and/or signals.

Generally, the UE reports the channel state information measured for the reference signal to the base station, so that the base station obtains the downlink channel quality, and performs the beam adjustment, and beam management on the downlink transmitting end, which is used for cell selection, cell handover, and coverage level selection. For the embodiment of the present application, the manner of adjusting the receiving and/or transmitting antenna(s) may also be determined according the measurement result(s) of the channel state information.

In this embodiment of the present application, at least one quantity in the following channel state information of one or more sets of reference signals may be measured:
   rank indication (RI): indicating the appropriate transmission rank considered by the UE, that is, the number of appropriate transmission layers for downlink transmission;
   precoding matrix indicator (PMI): indicating the appropriate precoding matrix considered by the UE when given the selected RI;
   channel quality indicator (CQI): indicating an appropriate channel-coding rate and a modulation scheme considered by the UE, when given the PMI;
   layer indicator (LI): indicating a column of the precoding matrix in the PMI, which corresponds to the strongest layer in the codeword of the CQI with largest wideband.

Wherein, the appropriateness considered by the UE indicates the result measured, calculated or inferred by the UE according to the downlink reference signal.
   layer 1-reference signal received power (L1-RSRP): which may be used for beam management.

In practical applications, the generalized channel state information also includes reference signal received power (RSRP, including L1-RSRP), reference signal received quality (RSRQ), and reference signal-signal to noise and interference ratio (RS-SINR), received signal strength indicator (RSSI), and other information representing the semi-static/long-term state of the channel. Those skilled in the art may select appropriate channel state information for measurement according to actual conditions, which should also be included in the protection scope of the present application.

Particularly, the CSI-RS may be used to measure RI, PMI, CQI and LI, for fine-tuning the beam; in addition, the CSI-RS may also be used to measure L1-RSRP, for beam management. Similarly, the SSB may also be used as the reference signal, for measuring L1-RSRP. In actual applications, the CSI-RS includes a periodic CSI-RS, an aperiodic CSI-RS, and a semi-persistent CSI-RS. During measuring, the UE assumes that identical beams are used for respective sets of reference signals, for example, corresponding to same Transmission Configuration Indication (TCI). The UE may perform beam sweep to detect the best receiving beam. This action may be implemented by the UE itself, with no need to report to the base station, and the report quantity is configured as "None" at this moment. If the UE measures multiple sets of reference signals, different beams may be used in different sets of reference signals. Since actually used beams are determined by the base station, the UE may only assume that the transmit beams in respective sets of reference signals are the same, and cannot assume that the beams between the different sets are the same.

In this embodiment of the present application, the UE may perform measurement antenna configuration for the channel state measurement according to base station configuration and/or autonomous selection, and perform the channel state measurement on one or more sets of reference signals based on the selected measurement antenna configuration.

Figure 3:
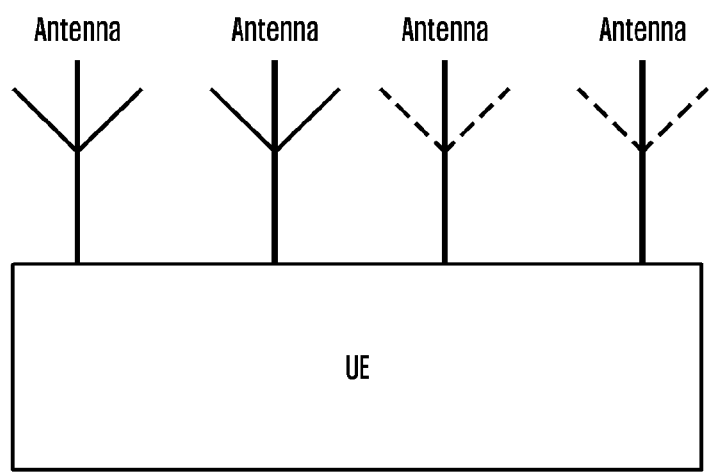
FIG. 3 is a schematic diagram of an antenna configuration provided by an embodiment of the present application.

Specifically, the measurement antenna configuration in the embodiment of the present application includes at least one of the following:
   1. all M antennas of the UE;
   That is, the UE may use all M antennas configured by the UE when performing channel state measurement on one or more sets of reference signals, for example, 4 antennas of the NRs, or 6, 8 or more antennas of the higher configuration.
   2. any N antenna(s) of all M antennas of the UE, N<M;
   That is, the UE may use any N antenna(s) in all M antennas configured by the UE when performing channel state measurement on one or more sets of reference signals, and as shown in FIG. 3, taking that the UE has M=4 antennas as an example, the antennas may be turned off to N=2 antennas to reduce power consumption. When performing channel state measurement by using 2 antennas, these may be any two of the 4 antennas, such as antenna 3 and antenna 4. The case of turning off to N=1 or N=3 antennas is analogous.

In the embodiment of the present application, the UE may select to use several antennas and which several antennas to perform measurement according to the configuration of the base station, and the UE may also autonomously select antennas to be used for measurement, for example, the UE selects {Antenna 1, Antenna 2} that are currently turned on for reception, according to previous experience or the current condition of transmitting and receiving antenna(s).

In a possible implementation, the N may also be directly configured by the base station or predefined in the protocol or determined by the UE. In this manner, the UE may use all M antennas for performing measurement or select one of various cases of N antenna(s) for performing measurement, by referring to the base station configuration or autonomous selection.

3. at least one antenna combination of all M antennas of the UE, wherein any antenna combination includes at least one of the M antennas;
   As shown in FIG. 3, taking that the UE has the M=4 antennas as an example, for the channel state measurement by using N=2 antennas, the UE may traverse all combinations: {antenna 1, antenna 2}, {antenna 1, antenna 3}, {antenna 1, antenna 4}, {antenna 2, antenna 3}, {antenna 2, antenna 4}, {antenna 3, antenna 4}, from which at least one combination is determined for performing measurement. The case of using N=1 or N=3 antennas is analogous.

In a possible implementation, the number N of antenna(s) included in any combination of antennas may be configured by the base station or predefined in the protocol or determined by the UE.

4. one or more sets of antennas whose the channel states satisfy preset conditions in all M antennas.

For example, an antenna combination that satisfies a preset condition has better measurement result(s) of the channel state, and even the best antenna combination may be selected by suitable preset condition. In a possible implementation, it may be determined according to historical measurement result(s) which set of antennas is the best. That is, after the UE traverses all the combinations, the measurement is performed by using the best set of antennas.

Then, the selected antenna(s) may be used to measure the channel state on one or more sets of reference signals, to obtain the measurement result(s).

In the embodiment of the present application, for determining the manner of adjusting the receiving and/or transmitting antenna(s) according to the service requirement required for signal transmission, the UE may determine the manner of adjusting the current receiving and/or transmitting antenna(s) according to the relationship between the rate and/or the block error rate and/or throughput of service requirement required for signal transmission and the respective corresponding threshold values.

Specifically, since the power consumption of the UE and the required performance are correspond to each other, it is possible to determine the number of antennas to be turned on or off according to service requirement to be transmitted. For example, for Ultra Reliable & Low Latency Communication (URLLC) services, it is necessary to turn on all antennas in order to satisfy the requirements of latency and reliability.

For example, when the data size (TBS) is small, the UE does not need to turn on many antennas. Alternatively, when the data arrives occasionally, or when the UE only needs to monitor Discontinuous Reception (DRX), the UE does not need to turn on many antennas. Alternatively, when the timer of DRX on duration is greater than a certain threshold, the UE may turn off certain receiving antenna(s). Meanwhile, in order to compensate for performance loss, the UE needs to monitor the PDCCH with a high aggregation level. Similarly, in the idle state or the connected state, when the channel condition is relatively good, for example, Signal to Interference plus Noise Ratio (SINR) is relatively high, some of the receiving antennas may be considered to be turned off since the measurement is more accurate. Alternatively, the accuracy requirement for measurement may be relaxed. Specifically, the base station may configure the UE with lower required measurement accuracy, so that the UE may autonomously select whether to turn off receiving antennas. Alternatively, the base station configures that the UE may turn off receiving antennas, which indicates that the accuracy requirement for measurement may be relaxed.

In the embodiment of the present application, the UE may autonomously determine the manner of adjusting the receiving and/or transmitting antenna(s) according to the measurement result(s) and/or the service requirement required for signal transmission (corresponding to the first mode hereafter), or the UE may transmit the measurement result(s) and/or the service requirement required for signal transmission to the base station and the base station determines the manner of adjusting the receiving and/or transmitting antenna(s) (corresponding to the second mode hereafter).

The embodiment of the present application provides a possible implementation for the first mode, wherein after the UE autonomously determines the manner of adjusting the receiving and/or transmitting antenna(s) according to the measurement result(s) and/or the service requirement required for signal transmission, in step S202, the UE may generate a request for adjusting the receiving and/or transmitting antenna(s) according to the determined manner of adjusting the receiving and/or transmitting antenna(s) and report the request for adjusting the receiving and/or transmitting antenna(s) to the base station. Wherein, the reporting request may be transmitted through at least one of the following: an RRC message, a medium access control (MAC) layer, an uplink control signal UCI, an uplink control channel PUCCH, and an uplink data channel PUSCH. In addition, the reporting request may be implicitly indicated by the existing reported information, for example, CSI reporting. If the reporting quantity RI=1, it indicates implicitly a reporting request. Alternatively, new reporting signaling or information may be defined to indicate the reporting request.

After receiving the request for adjusting the receiving and/or transmitting antenna(s) sent by the UE, the base station determines whether to allow the UE to adjust the current receiving and/or transmitting antenna(s), and after determining to allow the UE to adjust the current receiving and/or transmitting antenna(s), the base station sends the first adjustment configuration information on allowing the UE to adjust the current receiving and/or transmitting antenna(s).

Then, the UE may receive the first adjustment configuration information generated by the base station according to the request for adjusting the receiving and/or transmitting antenna(s), and adjust the current receiving and/or transmitting antenna(s) according to the determined manner of adjusting the receiving and/or transmitting antenna(s) based on the first adjustment configuration information, to response the beam change caused by the change of the number of antennas.

That is, in order to assist the base station to understand situation, the UE may report the manner of adjusting the receiving and/or transmitting antenna(s) to the base station. The base station may use this information to assist the UE to perform scheduling. As an example, if the uplink and downlink channels are reciprocal, and the UE adjusts the number of transmitting antennas and/or the beam, the reciprocity of the uplink and downlink channels is inevitably affected while keeping the number of transmitting antennas and/or the beam unchanged. Therefore, the UE notifies the base station of the manner of adjusting antenna(s) thereof, and the base station may perform scheduling according to the manner of adjusting antenna(s) and re-request the UE to perform downlink channel state reporting and/or uplink channel sounding, for example, transmitting the SRS.

Alternatively, in the process, the UE may simultaneously report the measured channel state information and/or the UE may simultaneously report the feedback measurement quantity of channel state.

The embodiment of the present application further provides a possible implementation for the first mode, wherein, after the UE autonomously determines the manner of adjusting the receiving and/or transmitting antenna(s) according to the measurement result(s) and/or the service requirement required for signal transmission, the UE autonomously adjusts the current receiving and/or transmitting antenna(s) according to the determined manner of adjusting the receiving and/or transmitting antenna(s), and reports the adjustment result(s) to the base station or not.

Then, in the embodiment of the present application, before the UE determines the manner of adjusting the receiving and/or transmitting antenna(s) according to the measurement result(s), it is necessary to determine whether the current receiving and/or transmitting antenna(s) need to be adjusted according to the measurement result(s).

Specifically, whether the current receiving and/or transmitting antenna(s) need to be adjusted may be determined by using at least one of the following:

1. the UE determines whether the current receiving and/or transmitting antenna(s) need to be adjusted according to a relationship between the channel state information measured based on the measurement antenna configuration and a threshold range corresponding to respective channel state information;
2. the UE determines whether the current receiving and/or transmitting antenna(s) need to be adjusted according to the relationship between a difference of the channel state information measured based on the different measurement antenna configurations and the corresponding threshold value;
3. the UE determines whether the current receiving and/or transmitting antenna(s) need to be adjusted according to a beam failure result measured based on the measurement antenna configuration.

In the embodiment of the present application, when determining the current receiving and/or transmitting antenna(s) to be adjusted, the manner of adjusting the current receiving and/or transmitting antenna(s) may be determined by at least one of the following:

1. the UE determines the manner of adjusting the current receiving and/or transmitting antenna(s) according to a relationship between a channel state information measured based on the measurement antenna configuration and the threshold range corresponding to respective channel state information;
2. the UE determines the manner of adjusting the current receiving and/or transmitting antenna(s) according to the relationship between the difference of channel state information measured based on different measurement antenna configurations and the corresponding threshold value;
3. the UE determines the manner of adjusting the current receiving and/or transmitting antenna(s) according to the beam failure result measured based on the measurement antenna configuration.

One or more quantities of the measured channel state information being within a certain range, may be a necessary condition or a sufficient condition, or a sufficient and necessary condition, to trigger the adjustment of the number of current receiving and/or transmitting antennas. Wherein, the certain range may be greater than or less than a threshold, or within a particular range. This particular range is configured by the base station or predefined in the protocol, or is implemented by the UE.

As an example, for L1-RSRP: when the L1-RSRP measured by using M antennas is less than or greater than a certain threshold, it is determined whether to adjust the number of current receiving and/or transmitting antennas. For example, when the L1-RSRP measured by using N antenna(s) is less than or greater than a certain threshold, it is determined whether to adjust the number of current receiving and/or transmitting antennas.

Alternatively, when the difference between the L1-RSRPs measured by using M antennas and N antenna(s) respectively is less than or greater than a certain threshold, it is determined whether to adjust the number of current receiving and/or transmitting antennas. For example, when the difference between the L1-RSRPs measured by using 4 antennas and 2 antennas respectively is less than a certain threshold, the UE may consider reducing the number of receiving antennas from 4 to 2, thereby reducing power consumption without losing a large performance. On the contrary, when the difference between the L1-RSRPs measured by using 4 antennas and 2 antennas respectively is greater than a certain threshold, the UE may consider increasing the number of receiving antennas from 2 to 4, thereby improving performance.

As an example, for RI: when RI=1 or RI=2, it indicates that the multipath of the channel is not abundant at this moment, or the correlation of the antennas is too strong to provide the rank required for the multi-antenna technology to increase the data rate. Then, it may be considered to turn off some antennas.

As an example, for the value of CQI and/or the strongest layer corresponding to LI, when the measured CQI or the corresponding LI is too small, it is necessary to consider whether to increase the number of receiving antennas. When the CQI or the corresponding LI is too large, it may be considered to turn off some antennas, since the channel conditions this moment are higher than the required channel conditions.

In the embodiment of the present application, the beam failure result may be obtained according to the measurement result(s) of the channel state. Specifically, the UE infers a hypothetical error rate of a particular channel by measuring the reference signal(s), in particularly, for example, a hypothetical error rate of the PDCCH. When this error rate is greater than a certain value, it is considered as a beam failure.

As an example, if the beam fails and not all the receiving antennas are turned on at this moment, priority will be given to consider to use more receiving antennas when performing beam recover, for enhancing the received signal strength and obtaining more spatial diversity effects, or adjust more appropriate beamforming.

In the embodiment of the present application, after receiving the predetermined configuration information transmitted by the base station, only the predetermined configuration information may be used to determine the manner of adjusting the receiving and/or transmitting antenna(s). When the UE receives the predetermined configuration information transmitted by the base station, the UE performs channel state measurement on one or more sets of reference signals according to the predetermined configuration information, and determines the manner of adjusting the receiving and/or transmitting antenna(s) according to the measurement result(s).

Wherein, the predetermined configuration information includes at least one of the following:

1. A Predetermined Codebook

For example, one or more of a Type I Single-Panel codebook, a Type I Multi-Panel codebook, and Type II codebooks may be used to determine the manner of adjusting the receiving and/or transmitting antenna(s). For example, when the base station configures these codebooks, it may be considered to reduce to 2 receiving antennas.

2. A Predetermined CQI Form for Block Error Rates

Since when the number of receiving antennas is reduced, for example, when 4 antennas are reduced to 2 antennas, the CSI feedback information required by the base station is also adjusted correspondingly. When the configured CQI form may be a corresponding particular block error rate (BLER), it may be used to determine the manner of adjusting the receiving and/or transmitting antenna(s). For example, only when the CQI form corresponding to 0.1 BLER, it may be considered to reduce to 2 receiving antennas.

3. A Predetermined Reference Signal

When the reference signal(s) configured to the UE are particular reference signal(s), it may be used to determine the manner of adjusting the receiving and/or transmitting antenna(s). For example, when the reference signal is configured as a particular one or a sets of CSI-RSs and/or SSBs, such as NZP CSI-RSs or CSI interference measurement (CSI-IM), it may be used to determine the manner of adjusting the receiving and/or transmitting antenna(s). Alternatively, when the base station configures particular CSI resources for adjusting of the number of antennas to the UE, the UE may consider reducing the number of receiving antennas.

Further, in step S202, the UE adjusts the current receiving and/or transmitting antenna(s) according to the determined manner of adjusting receiving and/or transmitting antenna(s), and performs reception of downlink signal and/or transmission of uplink signal by using the adjusted receiving and/or transmitting antenna(s).

The embodiment of the present application provides a possible implementation for the second mode, wherein, the UE may report the measurement result(s) and/or the service requirement required for the signal transmission to the base station. The base station determines the manner of adjusting receiving and/or transmitting antenna(s) according to the measurement result(s) and/or the service requirement required for the signal transmission, and generates the second adjustment configuration information. Wherein, the reporting request may be transmitted by using at least one of the following: an RRC message; a MAC layer; an uplink control signal UCI; an uplink control channel PUCCH; and an uplink data channel PUSCH. In addition, the reporting request may be implicitly indicated by the existing reported information. For example, in the CSI report, if the report quantity RI=1, it indicates implicitly a reporting request. Alternatively, new reporting signaling or information may be defined to indicate the reporting request.

Then, the UE receives second adjustment configuration information generated by the base station according to the measurement result(s) and/or the service requirement required for the signal transmission, and determines the manner of adjusting the receiving and/or transmitting antenna(s) based on the second adjustment configuration information.

For example, the UE may determine whether the trigger condition for adjusting the number of receiving and/or transmitting antennas is satisfied according to the measurement result(s) and/or the service requirement required for the signal transmission, and when it is satisfied, the UE transmits the request for adjusting the receiving and/or transmitting antenna(s) to the base station. The request may include a request content of the UE performing channel state report and/or beam recover. Meanwhile, whether or not to adjust the receiving and/or transmitting antenna(s) needs to be determined by the base station. In practical applications, the UE may send measurement result(s) of channel state measurement using different measurement antenna configurations, thereby assisting the base station to determine the manner of adjusting the receiving and/or transmitting antenna(s). The UE needs to perform antenna adjustment after receiving the second adjustment configuration information for indicating the manner of adjusting the receiving and/or transmitting antenna(s).

In the embodiment of the present application, before the UE reports the measurement result(s) to the base station, the UE may determine the measurement result(s) to be reported to the base station according to at least one of a configuration of base station, a transmission rule predefined by the base station, and a transmission rule predefined by the UE. That is, the UE may determine the measurement result(s) for reporting according to the configuration of the base station, or the UE may autonomously select one or all of the measurement results for reporting. Alternatively, the UE determines to report the measurement result(s) using M antennas and/or N antennas in M antennas according to a rule predefined by the UE or a rule predefined by the base station.

Specifically, at least one of the following cases is included:

1. the UE reports the measurement result(s) based on any of the measurement antenna configurations according to the relationship between the difference of the measurement results based on different measurement antenna configurations and the corresponding threshold value;
2. the UE reports the difference of the measurement results based on different measurement antenna configurations;
3. the UE reports the measurement result(s) of the measurement antenna configuration of which the measured channel state satisfies a preset condition;
4. the UE reports the measurement result(s) of at least one of measurement antenna configurations.

As an example, when the difference between the measurement result(s) using M antennas and the measurement result(s) using N antenna(s) in M antennas is greater than or less than a threshold, the measurement result(s) using M antennas and the measurement result(s) using N antenna(s) in M antennas are reported. Meanwhile, when the difference between receptions by using M antennas and N antenna(s) in M antennas is small (for example, less than a certain threshold), in order to save power, the antennas may be turned off to N receiving antenna(s). Then, the UE only needs to report the result of N antenna(s), for the resource scheduling reference of the base station. Similarly, when the difference between receptions by using M antennas and N antenna(s) in M antennas is large (for example, greater than a certain threshold), the M receiving antennas may be turned on to improve performance. Then, the UE needs to report the result of M antennas for resource scheduling reference of the base station. If the base station needs to determine whether to adjust the receiving and/or transmitting antenna(s) of the UE according to the measurement result(s), the UE needs to report the measurement result(s) of M and N antenna(s). In order to save overhead, one of the results and the difference between it and another result may be reported. For example, the result of the M antenna and the difference between it and the result of N antenna(s) are reported by the UE, therefore, only a small number of bits, for example, 2 bits, are required. Which result is to be reported may be configured by the base station or predefined by the protocol, or be selected by the UE to report the best result, and the UE report the number of antennas by which the best result is measured. Wherein, the measurement result(s) of N antenna(s) in M antennas may be at least one of the following: any N in M, part or all of combinations of every N antenna(s) in M antennas or, one or more sets of N antennas in M antennas with best channel state.

During measurement and reporting, the UE may try to use more than two types of number of antennas. For example, the UE will perform measurements using M antennas, as well as N1, N2, . . . antennas. For example, if the UE has 4 receiving antennas, the UE performs measurement using 1, 2, and 4 antennas, according to the configuration or the protocol, or by the UE autonomously selecting. During the reporting process, the UE reports information indicating the number of antennas used for the channel state quantity.

Alternatively, in the process, the UE may simultaneously report the measured channel state information.

In one example, the UE reporting the channel state quantity further includes one or more of periodic reporting, aperiodic reporting, and semi-persistent reporting. The particular manner used for reporting may be configured by the base station, or predefined by the base station and predefined by the UE jointly.

In the embodiment of the present application, the foregoing first adjustment configuration information and/or the second adjustment configuration information may be indicated by at least one of the following: radio resource control (RRC) signaling, downlink control information (DCI), and media access control (MAC). In this manner, when the UE receives the adjustment configuration information for indicating the adjustment of the number of receiving and/or transmitting antennas, the UE may directly adjust the number of receiving and/or transmitting antennas.

Alternatively, the signal transmission method provided by the embodiment of the present application may further include: the UE reports a UE measurement processing capability and/or whether the UE has an antenna adjustment capability, to the base station.

Different UEs have different processing capabilities due to different implementation methods.

For example, whether the UE needs reference signals at multiple moments to complete measurements of different antennas, or the UE needs reference signals only at one moment to complete measurements of different antennas.

Figure 4:
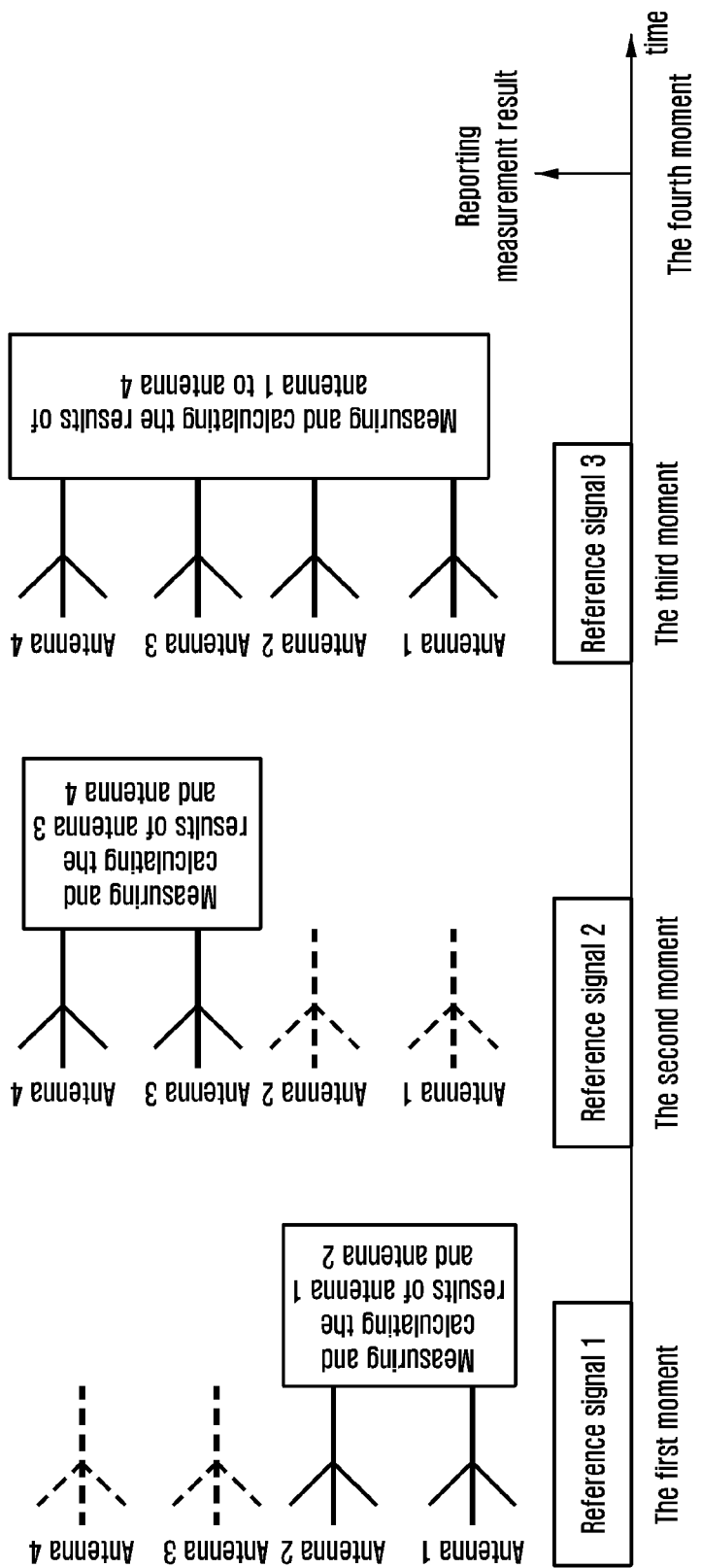
FIG. 4 is a schematic diagram of a UE measuring and calculating channel state information by using different antennas provided by an embodiment of the present application.

As an example, FIG. 4 is a schematic diagram of the UE measuring and calculating the channel state information by using different antennas. In the implementation shown in FIG. 4, in order to obtain the results of measuring channel state information by using different antennas, the UE needs to turn on different antennas for measurement and calculation at different moments.

For example, the UE uses the antenna 1 and the antenna 2 to measure the reference signal 1 and calculate the result at the first moment, and uses the antenna 3 and the antenna 4 to measure the reference signal 2 and calculate the result at the second moment, and uses all antennas from the antenna 1 to the antenna 4 to perform measurement and calculate the results at the third moment. Then the measurement and calculation may be completed before the fourth moment and reported. In order to make a fair comparison of the measurement results, reference signal 1, reference signal 2, and reference signal 3 need to be transmitted in the same manner, for example, by using the same beamforming. These reference signals may be used as a set of reference signals. If the UE needs to measure different transmit beamforming, then more sets of reference signals are needed.

If the UE has sufficient processing units (CPUs), the UE may simultaneously measure with antennas 1 to 4 and calculate the results at the first moment, so that one measurement delay may be reduced. Meanwhile, the UE needs more hardware capabilities.

Figure 5:
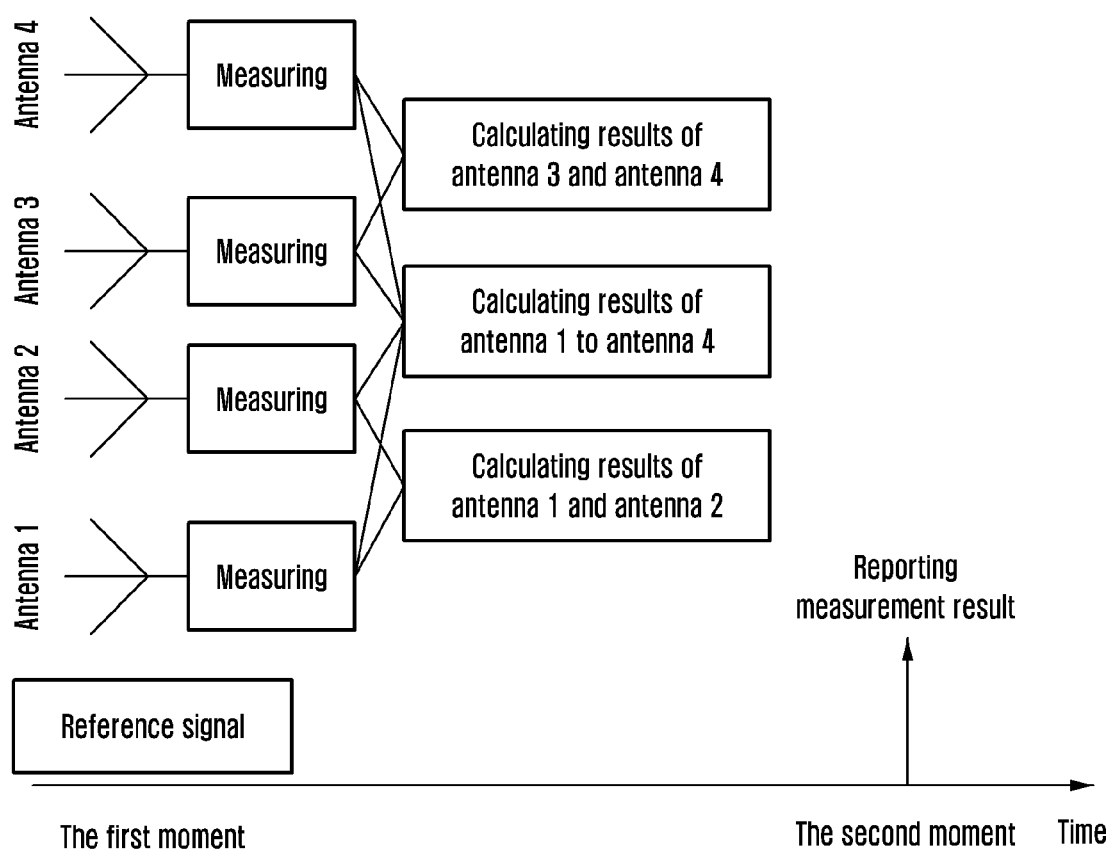
FIG. 5 is another schematic diagram of a UE measuring and calculating channel state information by using different antennas provided by an embodiment of the present application.

That is, in another example, FIG. 5 shows another schematic diagram of the UE measuring and calculating channel state information by using different antennas. In the implementation shown in FIG. 5, the UE may perform measurements of the antenna 1 to the antenna 4, and simultaneously calculate the results of the antenna 1 and the antenna 2, the results of the antenna 3 and the antenna 4, and the results of the antenna 1 to the antenna 4. For this implementation, all measurements may be completed with only one reference signal. Then, if the UE performs the measurement at the first moment, the measurement may be completed and the result(s) is calculated before the second moment, and the measurement result(s) is reported at the second moment. This implementation method requires the UE to have higher processing capability, so that its measurement delay is small.

A CSI processing criterion for the UE to measure channel states on one or more sets of reference signals includes at least one of the following:

The UE uses M antennas and any set of N antennas in M antennas to perform measurement without needing additional CPU resources, for example, in the manner as shown in FIG. 5.

The UE uses M antennas and a given set of N antennas in M antennas to perform measurement without needing additional CPU resources, for example, in the manner as shown in FIG. 4 or 5.

The UE uses M antennas and all sets of N antennas in M antennas to perform measurement without needing additional CPU resources, for example, in the manner as shown in FIG. 5.

The UE uses M antennas and any set of N antennas in M antennas to perform measurement with needing additional CPU resources, for example, in the manner as shown in FIG. 5.

The UE uses M antennas and a given set of N antennas in M antennas to perform measurement with needing additional CPU resources, for example, in the manner as shown in FIG. 4.

The UE uses M antennas and all sets of N antennas in M antennas to perform measurement with needing additional CPU resources, for example, in the manner as shown in FIG. 4.

Figure 6:
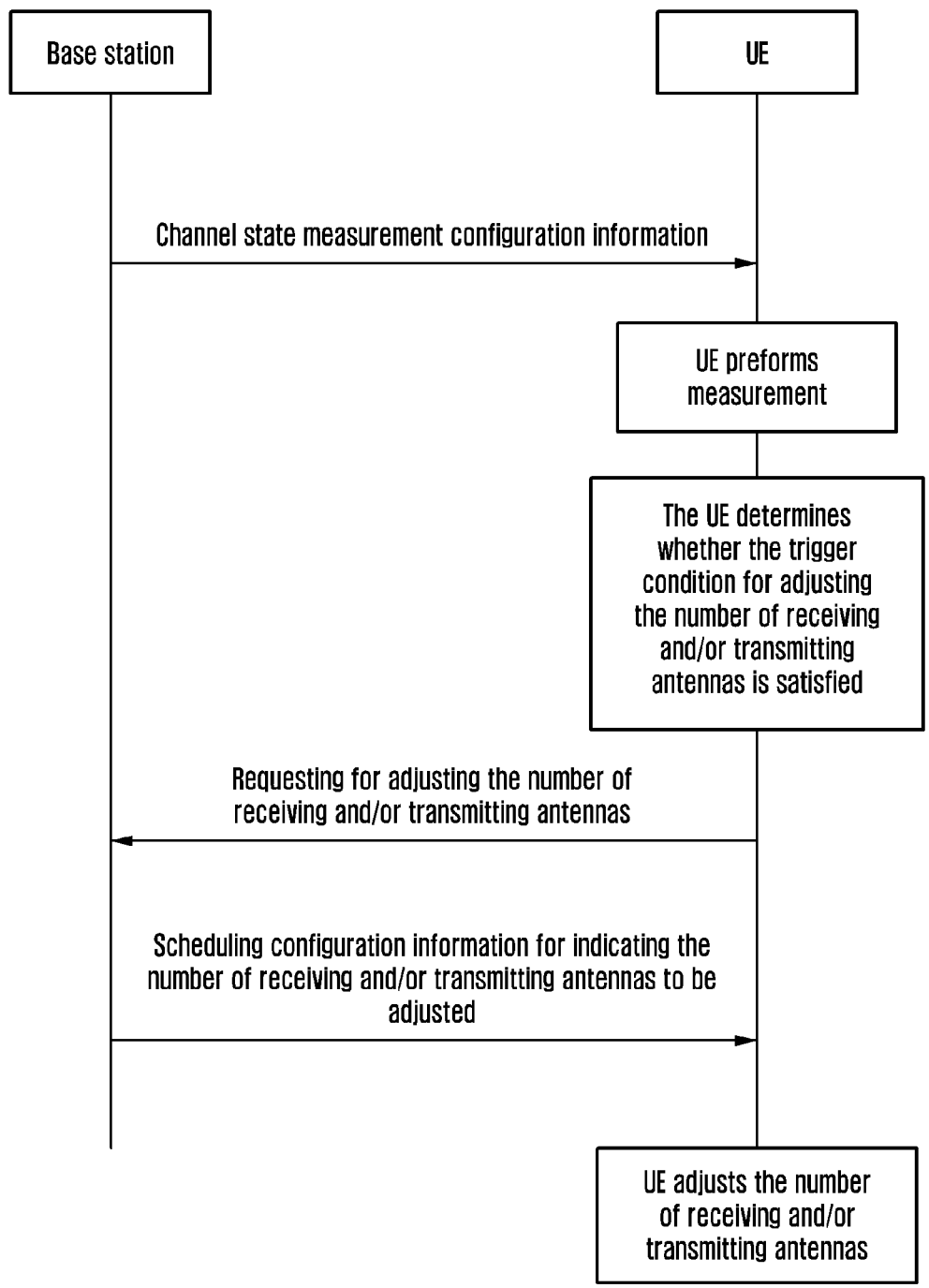
FIG. 6 is a second schematic diagram of a signal transmission method provided by an embodiment of the present application.

In order to better configure measurement resources for the UE, the UE needs to report such UE measurement processing capability to the base station, and the base station may configure measurement resources according to whether the UE has the capability of adjusting antenna(s). As shown in FIG. 6, in step S201, the UE may perform the channel state measurement on one or more sets of reference signals according to the channel state measurement configuration information configured by the base station, wherein the channel state measurement configuration information is determined by the base station according to the UE measurement processing capability.

The UE measurement processing capability refers to that the UE needs reference signals at multiple moments to complete measurements of different antennas, or the UE needs reference signals only at one moment to complete measurements of different antennas.

Figure 7:
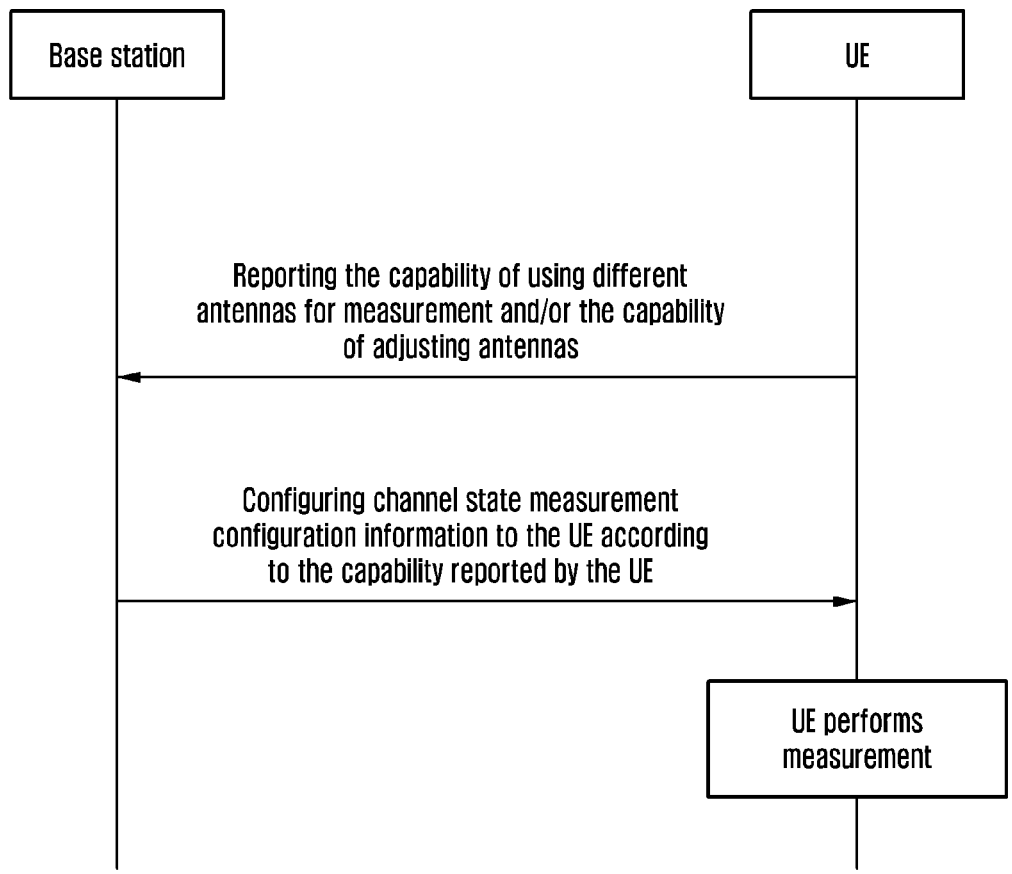
FIG. 7 is a third schematic diagram of a signal transmission method provided by an embodiment of the present application.

As shown in FIG. 7, the UE reports the capability of using different antennas for measurement and/or the capability of adjusting antenna(s) to the base station; the base station configures channel state measurement configuration information to the UE according to the processing capability reported by the UE; and the UE performs measurement according to the configuration information. For example, the UE reports to the base station whether additional CPUs are needed to perform measurement by using different antennas, for example, in the manner as shown in FIG. 4 or 5. If the UE reports to the base station that more than one moment is needed to complete the measurement in different antenna configurations, the base station may configure a set of reference signals for the UE to perform measurement. Alternatively, when the base station performs an aperiodic CSI reporting trigger (such as through a PDCCH order), the UE will be given a longer reporting time. Otherwise, if the UE may perform measurement in different antenna configurations on one reference signal, it is not necessary to specially configure reference signals at more than one moment, or it is not necessary to configure a longer reporting time to enable the UE completing the measurement and performing reporting.

Further, some UEs may have the capability of adjusting antenna(s), while some UEs do not have the capability of adjusting antenna(s). Whether the UE has the capability of adjusting antenna(s) may be reported to the base station.

After the UE sends the measurement result(s) to the base station, the base station determines whether to configure the adjustment of antenna(s) to the UE, according to the measurement result(s) and/or the service requirement required for signal transmission, in combination with the measurement processing capability of the UE and/or whether the UE has the capability of adjusting antenna(s), that is, whether to determine the manner of adjusting receiving and/or transmitting antenna(s) and generate the second adjustment configuration information.

It should be noted that, in the embodiment of the present application, the number of antennas used for receiving and transmitting may be the same or different.

The signal transmission method provided by the embodiment of the present application, determines a manner of adjusting receiving and/or transmitting antenna(s); adjusts the current receiving and/or transmitting antenna(s) according to the determined manner of adjusting receiving and/or transmitting antenna(s), and performs reception of downlink signal and/or transmission of uplink signal by using the adjusted receiving and/or transmitting antenna(s), which may adjust receiving and/or transmitting antennas(s) in real time according to actual situations, and perform reception and transmission of signal by using the adjusted antenna(s), thereby achieving the purpose of reducing unnecessary power consumption of UE and improving signal transmission efficiency.

Figure 8:
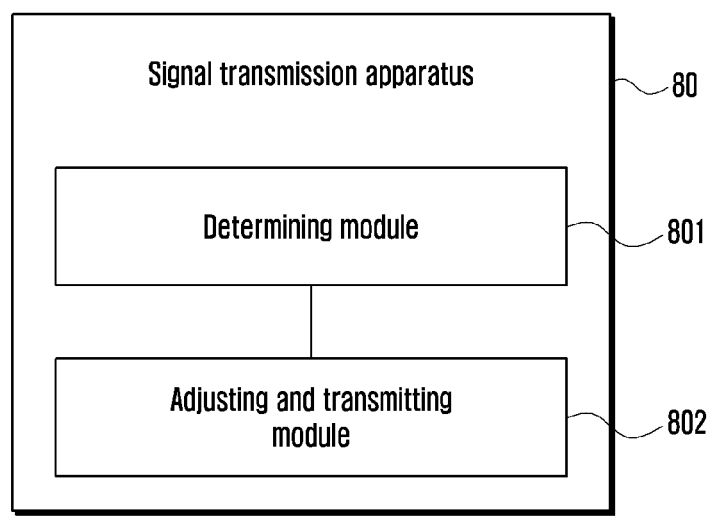
FIG. 8 is a schematic structural diagram of a signal transmission apparatus provided by an embodiment of the present application.

The embodiment of the present application further provides a signal transmission apparatus. As shown in FIG. 8, the signal transmission apparatus 80 may include: a determining module 801 and an adjusting and transmitting module 802, wherein, The determining module 801 is configured to determine a manner of adjusting receiving and/or transmitting antenna(s);

The adjusting and transmitting module 802 is configured to adjust the current receiving and/or transmitting antenna(s) according to the determined manner of adjusting receiving and/or transmitting antenna(s), and perform reception of downlink signal and/or transmission of uplink signal by using the adjusted receiving and/or transmitting antenna(s).

In an alternative implementation, the manner of adjusting the receiving and/or transmitting antenna(s) includes at least one of the following:

increasing the number of the current receiving/transmitting antennas;

reducing the number of the current receiving/transmitting antennas;

adjusting all of the current receiving and/or transmitting antenna(s) to a first particular antenna;

adjusting part of the current receiving and/or transmitting antenna(s) to a second particular antenna.

In an alternative implementation, the determining module 801 is specifically configured to perform channel state measurement on one or more sets of reference signals, and determine the manner of adjusting the receiving and/or transmitting antenna(s) according to the measurement result(s); and/or determine the manner of adjusting the receiving and/or transmitting antenna(s) according to service requirement required for signal transmission.

In an alternative implementation, the adjusting and transmitting module 802 is specifically configured to generate a request for adjusting the receiving and/or transmitting antenna(s), according to the determined manner of adjusting the receiving and/or transmitting antenna(s); report the request for adjusting the receiving and/or transmitting antenna(s) to a base station; receive first adjustment configuration information generated by the base station according to the request for adjusting the receiving and/or transmitting antenna(s), and adjust the current receiving and/or transmitting antenna(s) according to the determined manner of adjusting the receiving and/or transmit antenna(s) based on the first adjustment configuration information.

In an alternative implementation, the determining module 801 is specifically configured to report, by the UE, the measurement result(s) and/or the service requirement required for the signal transmission to the base station; receive second adjustment configuration information generated by the base station according to the measurement result(s) and/or the service requirement required for the signal transmission, and determine the manner of adjusting the receiving and/or transmitting antenna(s) based on the second adjustment configuration information.

In an alternative implementation, the determining module 801 is specifically configured to perform measurement antenna configuration for the channel state measurement according to base station configuration and/or autonomous selection; perform the channel state measurement on one or more sets of reference signals based on the measurement antenna configuration.

The measurement antenna configuration includes at least one of the following:

all M antennas of the UE;

any N antenna(s) of all M antennas of the UE, N<M;

at least one antenna combination of all M antennas of the UE, wherein any antenna combination includes at least one of the M antennas;

one or more sets of antennas in all M antennas of the UE whose the channel states satisfy preset conditions.

In an alternative implementation, the determining module 801 is specifically configured to determine, according to the measurement result(s), whether the current receiving and/or transmitting antenna(s) need to be adjusted;

wherein, the determining module 801 is specifically for at least one of the following:

the UE determines whether the current receiving and/or transmitting antenna(s) need to be adjusted according to a relationship between the channel state information measured based on the measurement antenna configuration and a threshold range corresponding to respective channel state information;

the UE determines whether the current receiving and/or transmitting antenna(s) need to be adjusted according to the relationship between a difference of the channel state information measured based on the different measurement antenna configurations and the corresponding threshold value;

the UE determines whether the current receiving and/or transmitting antenna(s) need to be adjusted according to a beam failure result measured based on the measurement antenna configuration.

In an alternative implementation, the determining module 801 is specifically for at least one of the following:

the UE determines the manner of adjusting the current receiving and/or transmitting antenna(s) according to a relationship between a channel state information measured based on the measurement antenna configuration and the threshold range corresponding to respective channel state information;

the UE determines the manner of adjusting the current receiving and/or transmitting antenna(s) according to the relationship between the difference of channel state information measured based on different measurement antenna configurations and the corresponding threshold value;

the UE determines the manner of adjusting the current receiving and/or transmitting antenna(s) according to the beam failure result measured based on the measurement antenna configuration.

In an alternative implementation, the determining module 801 is specifically configured to, perform channel state measurement on one or more sets of reference signals according to predetermined configuration information, and determine the manner of adjusting the receiving and/or transmitting antenna(s) according to the measurement result(s), when the UE receives the predetermined configuration information transmitted by the base station;

the predetermined configuration information includes at least one of the following:
a predetermined codebook;
a predetermined CQI form for block error rates;
a predetermined reference signal.

In an alternative implementation, the determining module 801 is specifically for at least one of the following:

the UE reports the measurement result(s) based on any of the measurement antenna configurations according to the relationship between the difference of the measurement results based on different measurement antenna configurations and the corresponding threshold value;

the UE reports the difference of the measurement results based on different measurement antenna configurations;

the UE reports the measurement result(s) of the measurement antenna configuration whose measured channel state satisfies a preset condition;

the UE reports the measurement result(s) of at least one of measurement antenna configurations.

In an alternative implementation, the determining module 801 is further for the UE to determine the measurement result(s) to be reported to the base station according to at least one of a base station configuration, a transmission rule predefined by the base station, and a transmission rule predefined by the UE.

In an alternative implementation, the first adjustment configuration information is indicated by at least one of the following:

radio resource control (RRC) signaling, downlink control information (DCI), and media access control (MAC).

In an alternative implementation, the second adjustment configuration information is indicated by at least one of the following:

radio resource control (RRC) signaling, downlink control information (DCI), and media access control (MAC).

In an alternative implementation, the determining module 801 is specifically configured to perform measurement on at least one of the following channel state information of the one or more sets of reference signals:

a rank indicator (RI);
a precoding matrix indicator (PMI);
a channel quality indicator (CQI);
a layer indicator (LI); and
layer 1-reference signal received power (L1-RSRP).

In an alternative implementation, the determining module 801 is specifically configured to determine the manner of adjusting the receiving and/or transmitting antenna(s) according to the relationship of the rate and/or the block error rate and/or throughput of service requirement required for the signal transmission and respective corresponding threshold values.

In an alternative implementation, the signal transmission apparatus 80 may further include a reporting module, wherein the reporting module is configured to report to the base station whether the UE has an antenna adjustment capability.

In an alternative implementation, the reporting module is further for the UE to report a UE measurement processing capability to the base station;

then, the determining module 801 is specifically configured to perform the channel state measurement on one or more sets of reference signals according to the channel state measurement configuration information configured by the base station, wherein the channel state measurement configuration information is determined by the base station according to the UE measurement processing capability.

In an alternative implementation, the UE measurement processing capability, includes any one of the following:

needing reference signals at multiple moments to complete measurements of different antennas;

needing reference signals only at one moment to complete measurements of different antennas.

The signal transmission apparatus provided by the embodiment of the present application, determines a manner of adjusting receiving and/or transmitting antenna(s); adjusts the current receiving and/or transmitting antenna(s) according to the determined manner of adjusting receiving and/or transmitting antenna(s), and performs reception of downlink signal and/or transmission of uplink signal by using the adjusted receiving and/or transmitting antenna(s), which may adjust receiving and/or transmitting antennas(s) in real time according to actual situations, and perform reception and transmission of signal by using the adjusted antenna(s), thereby achieving the purpose of reducing unnecessary power consumption of UE and improving signal transmission efficiency.

It may be clearly understood by those skilled in the art that the implementation principle and technical effects of the signal transmission apparatus provided by the embodiment of the present application are the same as those of the previous method embodiments. For a brief description, where the apparatus embodiment is not mentioned, reference may be made to the above method embodiments, and details are not described herein again.

The embodiment of the present application provides an electronic device, including: a processor and a memory, wherein the memory stores at least one instruction, at least one program, a code set or an instruction set, the at least one instruction, the at least one program, the code set or the instruction set being loaded and executed by the processor to implement the corresponding content in the foregoing method embodiments.

Alternatively, the electronic device may also include a transceiver. The processor is connected to the transceiver, such as via a bus. It should be noted that, in the actual applications, the number of the transceivers is not limited to one, and the structure of the electronic device does not constitute a limitation on the embodiments of the present application.

Wherein, the processor may be a CPU, a general-purpose processor, a DSP, an ASIC, and an FPGA or other programmable logic device, transistor logic device, hardware component, or any combination thereof. It is possible to implement or carry out the various illustrative logical blocks, modules and circuits described in connection with the present disclosure. The processor may also be a combination of computing functions, such as one or more microprocessor combinations, a combination of a DSP and a microprocessor, and the like.

The bus may include a path for communicating information between the above components. The bus may be a PCI bus or an EISA bus. The bus may be divided into an address bus, a data bus, a control bus, and the like. The memory may be a ROM or other type of static storage device that may store static information and instructions, RAM or other types of dynamic storage device that may store information and instruction, may also be EEPROM, CD-ROM or other optical disc storage, optical disc storage (including compression optical discs, laser discs, optical discs, digital versatile discs, Blu-ray discs, etc.), magnetic disk storage medium or other magnetic storage devices, or any other medium that may be used to carry or store desired program codes in form of instruction or data structure and may be accessed by the computer.

The electronic device provided by the embodiment of the present application, determines a manner of adjusting receiving and/or transmitting antenna(s); adjusts the current receiving and/or transmitting antenna(s) according to the determined manner of adjusting receiving and/or transmitting antenna(s), and performs reception of downlink signal and/or transmission of uplink signal by using the adjusted receiving and/or transmitting antenna(s), which may adjust receiving and/or transmitting antennas(s) in real time according to actual situations, and perform reception and transmission of signal by using the adjusted antenna(s), thereby achieving the purpose of reducing unnecessary power consumption of UE and improving signal transmission efficiency.

The embodiment of the present application further provides a computer readable storage medium for storing computer instructions that, when executed on a computer, enables the computer to execute to implement the corresponding content in the foregoing method embodiments.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other orders. Moreover, at least some of the steps in the flowchart of the drawings may include a plurality of sub-steps or stages, which are not necessarily performed at the same time, but may be executed at different times, and the execution order thereof does not need to be performed sequentially, but may be performed alternately or alternately with at least a portion of other steps or sub-steps or stages of other steps.

The above is only a part of the embodiments of the present application, and it should be noted that those skilled in the art may also make several improvements and modifications without departing from the principles of the present application. It should be considered as the scope of protection of the present application.

The invention claimed is:

1. A signal transmission method, comprising:
reporting, by a user equipment (UE) to a base station, a measurement processing capability and an antenna adjustment capability, wherein the measurement processing capability indicates whether the UE needs reference signals for multiple moments in time to complete measurements of different antennas or the UE needs reference signals only for one moment in time to complete measurements of different antennas;
measuring channel state information according to one or more measurement antenna configurations based on channel state measurement configuration information configured by the base station, wherein:
in case that the measurement processing capability indicates that the UE needs reference signals for multiple moments in time to complete measurements of difference antennas, the channel state measurement configuration information indicates the reference signals for multiple moments in time and the channel state information is measured using the reference signals for multiple moments in time, and
in case that the measurement processing capability indicates that the UE needs reference signals only for one moment in time to complete measurements of different antennas, the channel state measurement configuration information indicates that the UE needs reference signals only for one moment in time and the channel state information is measured using the reference signals only for one moment in time;
determining, by the UE based on the channel state information measured according to the one or more measurement antenna configurations, that antennas of the UE to be used for a reception of a downlink signal and/or transmission of an uplink signal need to be adjusted;
determining, by the UE, a manner for adjusting the antennas of the UE based on a beam failure result obtained based on the channel state information according to the one or more measurement antenna configurations, wherein the beam failure result is obtained according to whether a measured error rate is greater than a specific value;
adjusting the of the UE according to the determined manner; and
performing, by the UE, reception of the downlink signal and/or transmission of the uplink signal by using the adjusted antennas.

2. The signal transmission method according to claim 1, wherein the manner for adjusting the antennas of the UE comprises at least one of the following:
increasing a number of the antennas of the UE to be used for a reception of a downlink signal and/or transmission of an uplink signal;

reducing the number of the antennas of the UE to be used for a reception of a downlink signal and/or transmission of an uplink signal;

adjusting all of the antennas of the UE to be used for a reception of a downlink signal and/or transmission of an uplink signal to a first particular antenna; and adjusting part of the antennas of the UE to be used for a reception of a downlink signal and/or transmission of an uplink signal to a second particular antenna.

3. The signal transmission method according to claim 1, wherein determining the manner for adjusting the antennas of the UE, comprises:

performing channel state measurement on one or more sets of reference signals, and determining the manner for adjusting the antennas of the UE according to the one or more measurement results associated with the one or more sets of reference signals; and/or determining the manner for adjusting the antennas of the UE according to service requirement required for signal transmission.

4. The signal transmission method according to claim 1, wherein adjusting the antennas of the UE according to the determined manner further comprises:

generating a request for adjusting the antennas of the UE, according to the determined manner;

reporting the request to a base station by the UE; and receiving, by the UE, first adjustment configuration information generated by the base station according to the request, and adjusting, by the UE, the antennas of the UE according to the determined manner based on the first adjustment configuration information.

5. The signal transmission method according to claim 3, wherein determining the manner of adjusting the antennas of the UE according to one or more measurement results associated with the one or more sets of reference signals, and/or determining the manner of adjusting the antennas of the UE according to service requirement required for signal transmission, further comprises:

reporting the one or more measurement results and/or the service requirement required for the signal transmission to a base station by the UE; and receiving, by the UE, second adjustment configuration information generated by the base station according to the one or more measurement results and/or the service requirement required for the signal transmission, and determining, by the UE, the manner of adjusting the antennas of the UE based on the second adjustment configuration information.

6. The signal transmission method according to claim 3, wherein performing channel state measurement on one or more sets of reference signals by the UE, comprises:

identifying the one or more measurement antenna configurations for the channel state measurement according to base station configuration and/or autonomous selection; and performing the channel state measurement on one or more sets of reference signals based on the one or more measurement antenna configurations.

7. The signal transmission method according to claim 1, wherein, determining, by a user equipment (UE) based on the channel state information measured according to one or more measurement antenna configurations, that antennas of the UE to be used for a reception of a downlink signal and/or transmission of an uplink signal need to be adjusted based on at least one of the following:

a relationship between the channel state information measured based on the one or more measurement antenna configurations and a threshold range corresponding to respective channel state information;

a relationship between a difference of the channel state information measured based on different measurement antenna configurations and a corresponding threshold value; and the beam failure result measured based on the one or more measurement antenna configurations.

8. The signal transmission method according to claim 5, wherein reporting the one or more measurement results to the base station by the UE, comprises at least one of the following:

reporting the one or more measurement results based on any of the one or more measurement antenna configurations according to a relationship between a difference of the measurement results based on different measurement antenna configurations and a corresponding threshold value;

reporting, by the UE, the difference of the measurement results based on different measurement antenna configurations;

reporting, by the UE, the one or more measurement results of a measurement antenna configuration whose measured channel state satisfies a preset condition; and reporting, by the UE, the one or more measurement results of at least one of the one or more measurement antenna configurations.

9. The signal transmission method according to claim 1, wherein the manner for adjusting the antennas of the UE is determined based on at least one of:

a relationship between a channel state information measured based on the one or more measurement antenna configurations and a threshold range corresponding to respective channel state information; and a relationship between a difference of channel state information measured based on different measurement antenna configurations and a corresponding threshold value.

10. A signal transmission apparatus, comprising:

a reporting module configured to report, by a user equipment (UE) to a base station, a measurement processing capability and an antenna adjustment capability, wherein the measurement processing capability indicates whether the UE needs reference signals for multiple moments in time to complete measurements of different antennas or the UE needs reference signals only for one moment in time to complete measurements of different antennas, a determining module configured to:

measure channel state information according to one or more measurement antenna configurations based on channel state measurement configuration information configured by the base station, wherein:

in case that the measurement processing capability indicates that the UE needs reference signals for multiple moments in time to complete measurements of difference antennas, the channel state measurement configuration information indicates the reference signals for multiple moments in time and the channel state information is measured using the reference signals for multiple moments in time, and in case that the measurement processing capability indicates that the UE needs reference signals only for one moment in time to complete measurements of different antennas, the channel state measurement configuration information indicates that the UE needs reference signals only for one moment in time and the channel state information is measured using the reference signals only for one moment in time, determine, by the UE based on the channel state information measured according to the one or more measurement antenna configurations, that antennas of the UE to be used for a reception of a downlink signal and/or transmission of an uplink signal need to be adjusted, and determine a manner for adjusting the antennas of the UE based on a beam failure result obtained based on the channel state information according to the one or more measurement antenna configurations, wherein the beam failure result is obtained according to whether a measured error rate is greater than a specific value, and an adjusting and transmitting module configured to:
  adjust the antennas of the UE according to the determined manner, and
  perform, by the UE, reception of the downlink signal and/or transmission of the uplink signal by using the adjusted antennas.

11. An electronic device, comprising:
a processor; and
a memory, the memory comprising instructions that, when executed by the processor, cause the electronic device to:
  report, by a user equipment (UE) to a base station, a measurement processing capability and an antenna adjustment capability, wherein the measurement processing capability indicates whether the UE needs reference signals for multiple moments in time to complete measurements of different antennas or the UE needs reference signals only for one moment in time to complete measurements of different antennas,
  measure channel state information according to one or more measurement antenna configurations based on channel state measurement configuration information configured by the base station, wherein:
    in case that the measurement processing capability indicates that the UE needs reference signals for multiple moments in time to complete measurements of difference antennas, the channel state measurement configuration information indicates the reference signals for multiple moments in time and the channel state information is measured using the reference signals for multiple moments in time, and
    in case that the measurement processing capability indicates that the UE needs reference signals only for one moment in time to complete measurements of different antennas, the channel state measurement configuration information indicates that the UE needs reference signals only for one moment in time and the channel state information is measured using the reference signals only for one moment in time;
  determine, by the UE based on the channel state information measured according to the one or more measurement antenna configurations, that antennas of the UE to be used for a reception of a downlink signal and/or transmission of an uplink signal need to be adjusted;
  determine a manner for adjusting the antennas of the UE based on a beam failure result obtained based on the channel state information according to the one or more measurement antenna configurations, wherein the beam failure result is obtained according to whether a measured error rate is greater than a specific value;
  adjust the antennas of the UE according to the determined manner; and
  perform, by the UE, reception of the downlink signal and/or transmission of the uplink signal by using the adjusted antennas.

12. A non-transitory computer readable storage medium comprising instructions that, when executed by a processor, cause the processor to:
  report, by a user equipment (UE) to a base station, a measurement processing capability and an antenna adjustment capability, wherein the measurement processing capability indicates whether the UE needs reference signals for multiple moments in time to complete measurements of different antennas or the UE needs reference signals only for one moment in time to complete measurements of different antennas;
  measure channel state information according to one or more measurement antenna configurations based on channel state measurement configuration information configured by the base station, wherein:
    in case that the measurement processing capability indicates that the UE needs reference signals for multiple moments in time to complete measurements of difference antennas, the channel state measurement configuration information indicates the reference signals for multiple moments in time and the channel state information is measured using the reference signals for multiple moments in time, and
    in case that the measurement processing capability indicates that the UE needs reference signals only for one moment in time to complete measurements of different antennas, the channel state measurement configuration information indicates that the UE needs reference signals only for one moment in time and the channel state information is measured using the reference signals only for one moment in time;
  determine, by the UE based on the channel state information measured according to the one or more measurement antenna configurations, that antennas of the UE to be used for a reception of a downlink signal and/or transmission of an uplink signal need to be adjusted;
  determine a manner for adjusting the antennas of the UE based on a beam failure result obtained based on the channel state information according to the one or more measurement antenna configurations, wherein the beam failure result is obtained according to whether a measured error rate is greater than a specific value;
  adjust the antennas of the UE according to the determined manner; and
  perform, by the UE, reception of the downlink signal and/or transmission of the uplink signal by using the adjusted antennas.

* * * * *